Oct. 16, 1934.  E. N. SNODGRASS  1,976,859
APPARATUS FOR PREPARING COMPOSITE ICE CREAM BRICKS
Filed Dec. 12, 1932
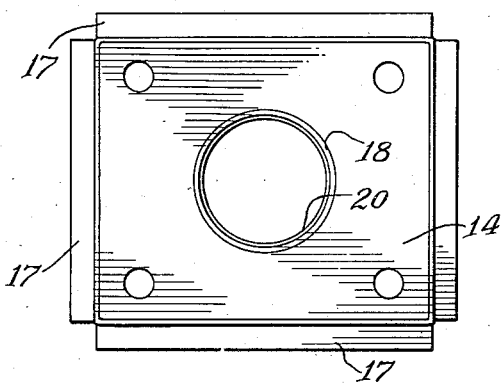
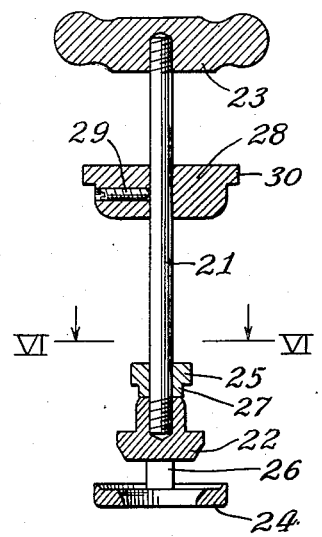
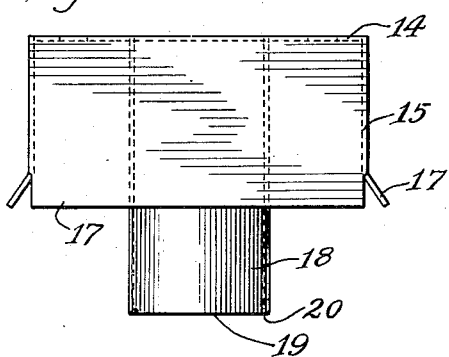
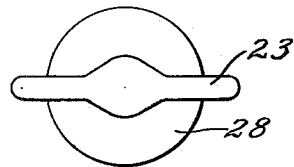
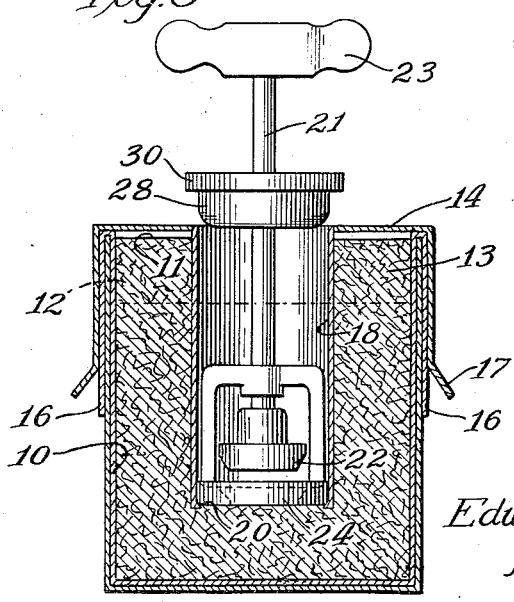
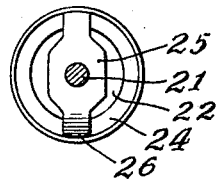
Inventor:
Edward Norman Snodgrass
By Harry C. Alberts
Atty.

Patented Oct. 16, 1934

1,976,859

UNITED STATES PATENT OFFICE 1,976,859

APPARATUS FOR PREPARING COMPOSITE ICE CREAM BRICKS

Edward Norman Snodgrass, Denver, Colo., assignor to Norman Confections, Inc., Denver, Colo., a corporation of Colorado Application December 12, 1932, Serial No. 646,862

5 Claims. (Cl. 107—1)

This invention relates to refrigerated composite product forming devices and more particularly to a novel device for incorporating a filler in a normally unstable product, although certain features thereof may be employed with equal advantage for other purposes.

It contemplates more especially the provision of a novel device for enabling the assimilation of a filler with a normally unstable product so as to maintain the relative association for and during consumption without entailing much time, labor and expense in the production thereof.

Ice cream products and refrigerated edibles are becoming increasingly popular, and composite products of that character are of considerable importance in the industry from a demand standpoint. It has been found very expensive and difficult to combine the various constituents of a composite ice cream product without entailing appreciable labor, expense and production retardation. Further, it is necessary or at least highly desirable that the filler of a refrigerated product occupy a predetermined relation with the body thereof, and to this end a simple and manually practical device has been provided to overcome the disadvantages of ordinary mechanical production of composite edibles.

One object of the present invention is to provide novel means for enabling the incorporation of a filler in a normally unstable product to occupy a predetermined relation therewith.

Another object is to simplify the construction and the operation of devices of the character mentioned.

Still another object is to provide a device for providing a preformed cavity in a refrigerated product so as to enable the introduction of a filler therein.

A further object is to provide a device for normally forming a cavity in a plastic mass to enable the incorporation of a predetermined quantity of filler for complete enclosure therein.

A still further object is to provide a cavity defining mechanism for a plastic mass together with a plunger for cooperation therewith in effecting the incorporation of a filler in predetermined composite relation.

A still further object is to provide a cavity forming device that is readily associated and disassociated with a container serving as a confining medium for normally unstable composite products.

Other objects and advantages will appear from the following description of an illustrative embodiment of the present invention.

In the drawing:

Figure 1 is a plan view of a container closure plate and cavity defining member.

Figure 2 is a front view in elevation of the device shown in Figure 1.

Figure 3 is a sectional view in elevation of a cavity forming device and associated mechanism enabling the incorporation of a filler in a soft freeze or other plastic mass.

Figure 4 is a sectional view in elevation of a plunger mechanism designed for telescopic association with the closure plate disclosed in Figure 1.

Figure 5 is a plan view of the device shown in Figure 4.

Figure 6 is a sectional view in elevation taken substantially along line VI—VI of Figure 4.

The structure selected for illustration is shown in association with a carton 10 of standard or approved construction which serves as a container into which a soft plastic or flowable freeze 11 is poured directly from a machine utilized for the production thereof. Any ice cream producing machine may be employed for this purpose, and the cartons 10 may be supplied to the discharge end of said machine by progressive intermittent movements along a predetermined path until the contents of the cartons reach an unfilled level as illustrated by the dotted line 12 in Figure 3. The initial level 12 of the soft freeze 11 within the container 10 may be determined and selected so that the unfilled or unoccupied container volume 13 defined between the initial freeze level 12 and the top of the carton 10, is equivalent to and corresponds with the eventual cavity to be formed in a manner which will appear more fully hereinafter. Obviously, the unoccupied volume 13 at the terminus of the initial step of the process will vary depending upon the capacity of the container 10 and the desired volume of the filler to be confined within the edible casing.

With the container 10 filled with the flowable freeze 11 to the level 12, it passes to an operator who utilizes a novel device to incorporate a filler for total confinement therein. In its preferred embodiment, the filler incorporating device comprises a plate 14 corresponding in shape with the top area of the carton 10 with depending sides 15 sized and shaped to telescopically effect the reception thereof. In the telescoped position of the container closure plate 14, the carton flaps 16 are reversely folded to parallel the container sides in continuity therewith. It is to be noted that the depending sides 15 of the closure plate 14 terminate in outwardly inclined extensions 17 which enable the ready reception of the container 10 with its flaps 16 having the open region thereof closed by the plate 14 in its completely telescoped position.

As shown, the closure plate 14 is centrally apertured to receive an elongated tube 18 for communication therethrough, the tube 18 terminating in an open end 19 which does not extend for the entire depth of the container 10 with the closure plate 14 in its completely telescoped position. The open end 19 of the tube 18, in this instance, is provided with an inwardly directed peripheral ridge 20 to limit the reception of the plunger mechanism to be presently described. The plunger mechanism comprises, in this instance, a rod 21 which terminates in a circular valve 22 fixed to one extremity thereof. The other extremity of the rod 21 is provided with a handle member 23 to enable the manual manipulation and displacement of the valve 22 together with its auxiliary parts within the tube 18. As shown, a valve seat 24 sized and shaped to correspond with and serve as a complement of the valve 22, is slidably associated with the rod 21 through the medium of an inverted U-shaped bracket 25 having the arms 26 thereof in attached engagement with the valve seat body 24.

The bracket 25 is preferably provided with a boss 27 formed along the vertical longitudinal median line, it being bored to slidably receive the rod 21 so that the valve seat 24 will fully occupy the tube 18 and be slidable therealong for engagement with the peripheral ridge 20 to serve as a closure for the tube 18. In its fully telescoped position, the valve seat 24 engages the valve 22 so as to completely close the tube 18, and a stop member 28 may be fixed to the rod 21 so as to close the other end of the tube 18, it being provided with a set screw or other fastener 29 to adjust the position thereof along the rod 21. In this instance, stop member 28 is provided with a shoulder 30 which rests upon the closure plate 14 to guide the rod 21 and assist in the alignment of the valve seat 24 slidable therealong for association and removal relative to the valve 22.

With the arrangement of parts above described, it is apparent that the closure plate 14 with its plunger mechanism in fully telescoped position within the tube 18 may be placed upon the carton 10 after it has been filled with a freeze to a level 12 leaving an unoccupied volume equivalent to the volume of the tube 18 which depends in the soft freeze 11 for a distance short of the bottom thereof. As a result, the tube 18 which is closed by the valve 22 and its valve seat 24, displaces the freeze 11 so as to substantially occupy the interior volume of the container 10. Thereupon, the plunger mechanism is removed by exerting an upward pull upon the handle member 23. This initially removes the valve 22 from its seat 24 to establish communication between the atmosphere and the tube interior so as to afford the ready removal of the valve seat 24 without withdrawing the freeze 11 therewith into the tube 18. Upon the removal of the plunger mechanism, a cavity is defined within the container 10 by means of the tube 18 in that the freeze 11 is of such a plastic character as to preclude the immediate upward displacement thereof.

The container 10 is then moved along a predetermined path of travel for the incorporation of a filler therein. The filler may be of any desired character and could consist of dried or candied fruit, nuts or other edible solids poured or otherwise incorporated therein through a funnel or a spout should commercial practice so dictate. The tube 18 is, thereupon, filled with the edible solids or a mixture thereof with a viscous or liquid substance of a predetermined level. Thereupon the closure plate 14 with its tube 18 is removed from its container 10, and the resulting product is now ready for further filling with additional freeze 11 to fully enclose the filler as well as completely occupy the container 10. The flaps 16 of the container 10 are then overlapped and connected so as to protect and fully enclose the contents 11 with its filler in suspension. The containers 10 are then transferred to the hardening room for subjection to lower temperatures to effect the complete freezing thereof to define a form-maintaining and retaining casing.

It is to be noted that with solid fillers of a unitary character and preformed configuration, no apparatus or expedient may be utilized to any advantage except by direct manual grasp and submerged displacement within the freeze 11. In short, a solid edible filler such as a preformed elongated bar of fudge or other substance may be sized to correspond with the unoccupied container volume 13 for direct incorporation within the freeze 11 by manual submergence until the level 12 thereof fully occupies the container 10. Thereupon, the carton container 10 may be closed and removed to the hardening room for freezing in a manner and for the purpose described supra.

With the arrangement of parts above described, a novel device has been provided to efficiently and rapidly introduce fillers within a soft or plastic freeze in the production of a composite product of a normally unstable character.

Various changes may be made in the embodiment of the invention herein specifically described without departing from or sacrificing any of the advantages of the invention as defined in the appended claims.

I claim:

1. In a self-contained core filling device of the character described, the combination with a portable closure plate for telescopically receiving a container, of an elongated tubular member extending through said closure plate for joinder therewith, and a plunger mechanism telescopically disposed within said tubular member through the plate end thereof for selectively closing the other end of said tubular member.

2. In a self-contained core filling device of the character described, the combination with a portable closure plate for a container, of an elongated tubular member extending through said closure plate for joinder therewith, a plunger mechanism telescopically disposed within said tubular member through the plate end thereof for selectively closing the other end of said tubular member, and means for limiting the extent of plunger reception within said tubular member.

3. In a self-contained core filling device of the character described, the combination with a closure plate for telescopically receiving a container, of an elongated tubular member extending through said closure plate for joinder therewith, a plunger mechanism telescopically disposed within said tubular member through the plate end thereof for selectively closing the other end of said tubular member, and means for limiting the extent of plunger reception within said tubular member, said plunger mechanism including a closure valve and a valve seat mounted for movement relative to said closure valve.

4. In a self-contained core filling device, the combination with a portable closure plate for telescopically receiving a container, of a tubular member extending through said closure plate for joinder therewith, a closure valve freely movable within said tubular member, a valve seat corresponding in size to said tubular member for telescopic reciprocation therein, said valve seat being complemental to said valve for closing said tubular member, and a plunger rod for maintaining said valve and seat in aligned relatively movable relation.

5. In a self-contained core filling device, the combination with a portable closure plate for telescopically receiving a container, of a tubular member extending through said closure plate for joinder therewith, a closure valve freely movable within said tubular member, a valve seat corresponding in size to said tubular member for telescopic reciprocation therein, said valve seat being complemental to said valve for closing said tubular member, a plunger rod fixed to said closure valve, and means on said valve seat for slidable engagement of said rod to guide said valve and seat relatively to each other.

EDWARD NORMAN SNODGRASS.